(12) United States Patent
Yang et al.

(10) Patent No.: US 12,579,564 B1
(45) Date of Patent: Mar. 17, 2026

(54) IMAGE-BASED COMPLEMENTARY ITEM RECOMMENDATIONS

(71) Applicant: Amazon Technologies, Inc., Seattle, WA (US)

(72) Inventors: Shan Yang, Sunnyvale, CA (US); Xijun Wang, Greenbelt, MD (US); Anqi Liang, Seattle, WA (US); Ming Lin, Bethesda, MD (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 18/083,347

(22) Filed: Dec. 16, 2022

(51) Int. Cl.
*G06Q 30/0601* (2023.01)
*G06T 1/00* (2006.01)
*G06V 10/74* (2022.01)
*G06V 10/82* (2022.01)
*G06V 20/00* (2022.01)

(52) U.S. Cl.
CPC ....... *G06Q 30/0631* (2013.01); *G06T 1/0021* (2013.01); *G06V 10/761* (2022.01); *G06V 10/82* (2022.01); *G06V 20/35* (2022.01)

(58) Field of Classification Search
CPC ........... G06T 7/246; G06T 2207/10016; G06T 2207/20021; G06T 2207/20084; G06T 7/248; G06V 20/20; G06V 10/26; G06V 10/82; G06V 20/40
See application file for complete search history.

(56) References Cited

U.S. PATENT DOCUMENTS

| | | | |
|---|---|---|---|
| 10,706,450 B1 * | 7/2020 | Tavernier ........... | G06Q 30/0641 |
| 10,915,818 B1 | 2/2021 | Patel et al. | |
| 2020/0311798 A1 * | 10/2020 | Forsyth .................... | G06N 3/04 |
| 2021/0042503 A1 | 2/2021 | Karras et al. | |
| 2022/0245322 A1 * | 8/2022 | Lundin .................... | G06N 3/09 |
| 2023/0169362 A1 * | 6/2023 | Beucher ................. | G06N 3/096 |
| | | | 706/12 |
| 2024/0242106 A1 * | 7/2024 | Shamir .............. | G06Q 30/0282 |

OTHER PUBLICATIONS

Kang et al., "Complete the Look: Scene-based Complementary Product Recommendation," 10 pages (not dated) [also published as *Proceedings of the IEEE/CVF Conference on Computer Vision and Pattern Recognition (CVPR)*, 2019, pp. 10532-10541].

(Continued)

*Primary Examiner* — Amara Abdi
(74) *Attorney, Agent, or Firm* — Klarquist Sparkman, LLP

(57) ABSTRACT

A two-stage learning framework provides image-based complementary item recommendations. After receiving an image of a real-world scene depicting at least one object, the first stage generates feature embeddings for the real-world scene and the at least one object. The second stage generates a predicted feature embedding for at least one predicted object from the feature embeddings obtained from the first stage, generates a category embedding for the at least one predicted object from the predicted feature embedding, generates a recommended feature embedding for at least one recommended object from the predicted feature embedding and the category embedding, and outputs an identifier of the at least one recommended object, wherein the at least one recommended object is complementary to the at least one object.

12 Claims, 9 Drawing Sheets

(56) References Cited

OTHER PUBLICATIONS

Sakar et al., "OutfitTransformer: Learning Outfit Representations for Fashion Recommendation," *arXiv:2204.04812v2 [cs.CV]*, 15 pages (Apr. 2022).

Taraviya et al., "Personalized Compatibility Metric Learning," KDD'21, Aug. 14-18, 2021 [*In Proceedings of KDD 2021 (KDD'21). ACM, New York, NY, USA,* 7 pages. https://doi.org/10.1145/1122445. 1122456].

Vaswani et al., "Attention Is All You Need," *31st Conference on Neural Information Processing Systems (NIPS 2017)*, Long Beach, CA, USA; arXiv:1706.03762v5 [cs.CL], pp. 1-15 (Dec. 2017).

Xu et al., "POG: Personalized Outfit Generation for Fashion Recommendation at Alibaba iFashion," *In Proceedings of The 25th ACM SIGKDD Conference on Knowledge Discovery and Data Mining, Anchorage, AK, USA, Aug. 4-8, 2019 (KDD '19)*, 9 pages, DOI: 10.1145/3292500.3330652; arXiv:1905.01866v3 [cs.IR] (May 2019).

Yan et al., "Personalized Complementary Product Recommendation," *WWW '22, Apr. 25-29, 2022, Virtual Event, Lyon, France; In Proceedings of the ACM Web Conference 2022 (WWW '22). ACM, New York, NY, USA,* 5 pages (Apr. 2022).

* cited by examiner

FIG. 3

IMAGE-BASED COMPLEMENTARY ITEM RECOMMENDATIONS

BACKGROUND

Online catalog shopping provides great convenience such as searching and comparing similar items, as well as access to a larger catalog of products compared to a typical, physical retail store. However, while in a physical store, customers are immersed in related products. For example, in kitchenware stores, utensils are sold right next to dinnerware. This type of shelving technique allows customers to quickly shop for related products. In clothing stores, sellers dress up models with outfits including individual clothing items that would look good together. While catalog shopping provides a fast way of shopping when the customer is at the last stage of the shopping journey (e.g., the evaluation stage), this approach misses the searching stage of the shopping journey. Complementary item recommendation offers the customer products that they could be searching for in their next shopping journey.

BRIEF DESCRIPTION OF THE DRAWINGS

FIG. 3 shows a diagram illustrating an example architecture for a transformer model with a plurality of attention layers.

DETAILED DESCRIPTION

For image-based complementary item recommendations, a customer can take a photograph of an object in a real-world setting and receive recommendations of products that are complementary to the object. For example, a customer may take a photograph of a couch that they own, where the couch is located in the customer's home, or the customer may take a photograph of a couch that they are considering purchasing, which may be located somewhere else. A product that complements the couch would be stylistically similar to and/or compatible with the couch. Recommendations of complementary products may therefore include recommendations of stylistically similar couches (potentially including the couch itself), as well as recommendations of stylistically similar and/or compatible products from other categories, such as coffee tables, lamps, home decor, shelves, rugs, and so on. In this way, customers can easily find and shop for products that complement items they like.

Image-based complementary item recommendations as provided herein use a two-stage machine learning framework. The first stage includes a first machine learning model, while the second stage includes a second machine learning model, a third machine learning model, and a fourth machine learning model. After receiving an image of a real-world scene depicting at least one object, the first machine learning model of the first stage generates feature embeddings for the real-world scene and the at least one object. At the second stage, the second machine learning model generates a predicted feature embedding for at least one predicted object from the feature embeddings obtained from the first stage. The third machine learning model generates a category embedding for the at least one predicted object from the predicted feature embedding. The fourth machine learning model then generates a recommended feature embedding for at least one recommended object from the predicted feature embedding and the category embedding. The two-stage machine learning framework then outputs an identifier of the at least one recommended object, wherein the at least one recommended object is complementary to the at least one object.

Figure 1:
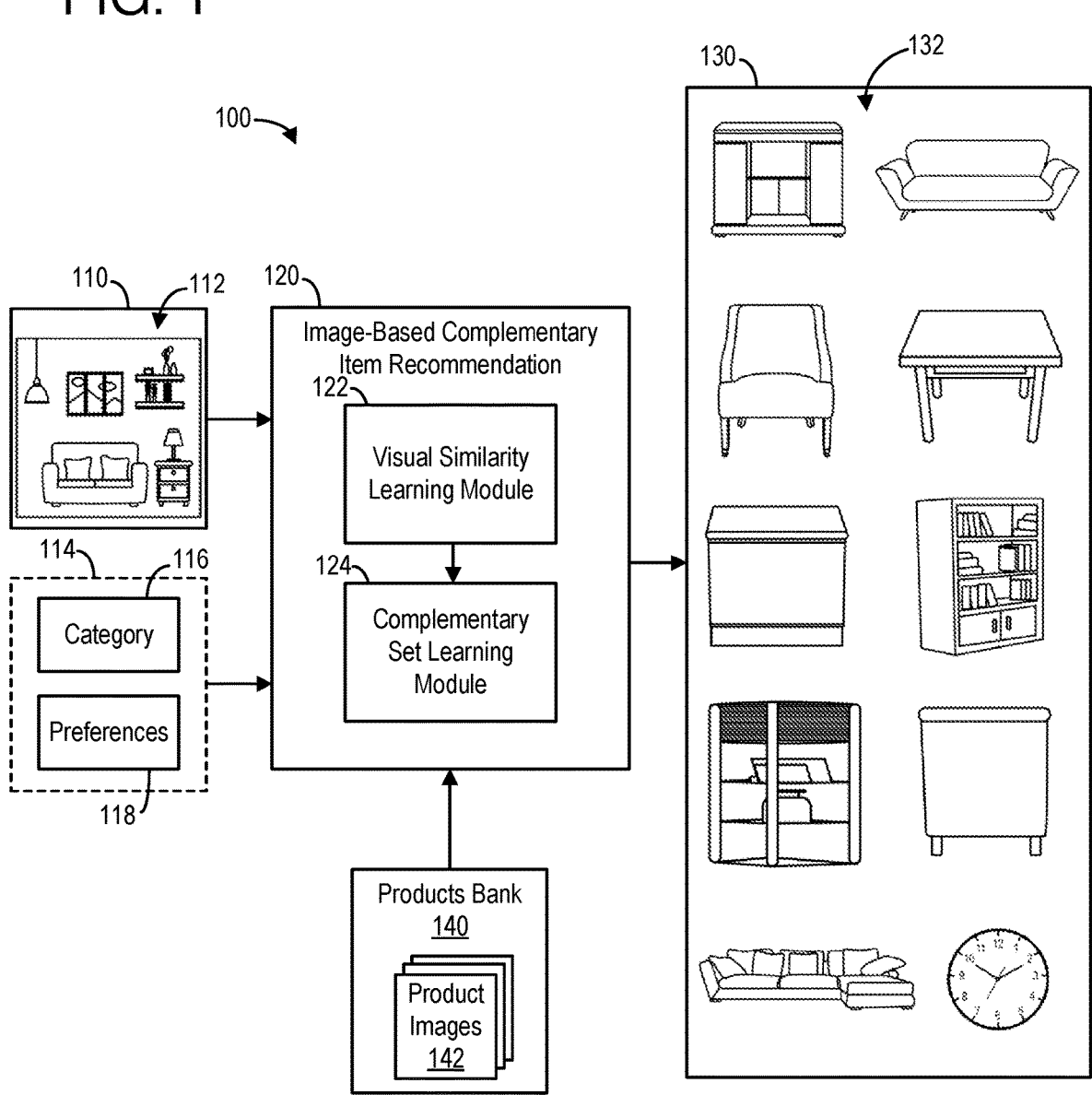
FIG. 1 shows a diagram illustrating an example system for image-based complementary item recommendations.

FIG. 1 shows a diagram illustrating an example system 100 for image-based complementary item recommendations. A scene image 110 comprises a photograph depicting one or more objects 112. The scene image 110 may be uploaded or otherwise input by a user, such as a customer. This scene image 110 is input to an image-based complementary item recommendation system 120, which in turn generates output 130 comprising one or more objects 132 that are complementary to the objects 112 depicted in the scene image 110. The output 130 may comprise a user interface depicting the complementary objects 132, for example, to the user who uploaded the scene image 110. The complementary item recommendation system 120 may generate the output 130, including the objects 132, according to a products bank 140 of product images 142. Thus, the customer or user may input the scene image 110 in order to obtain recommendations of complementary products, where complementary products comprise products that are complementary to the object(s) 112 in the scene image 110, and thus may be visually or stylistically similar to the objects 112 in the scene image 110 as well as complementary to the objects 112 in the scene image 110. For example, for a piece of furniture depicted in the scene image 100, the recommended complementary products 132 may include furniture and/or home decor in different categories than the piece of furniture depicted in the input image while maintaining a similar or consistent style (e.g., color, texture, and so on).

In some examples, optional input 114 may be provided to the image-based complementary item recommendation system 120 to further guide the recommendations. Optional input 114 may include a category 116 for the product(s) to be recommended. For example, the customer may want to see a specific type of furniture that is complementary to the objects 112 depicted in the scene image 110, such as shelving. By inputting a shelving category 116 to the image-based complementary item recommendation system 120 along with the scene image 110, the output 130 may be limited to shelving products that are complementary to the objects 112. Optical input 114 may additionally or alternatively include preferences 118. Preferences 118 may comprise personal preferences of the customer, such as stylistic preferences of the customer, which may be manually input by the customer and/or automatically determined based on products the customer purchased or indicated they prefer. By inputting personal preferences 118 along with the scene image 110 to the image-based complementary item recommendation system 120, the output 130 may be limited to products that are complementary to the objects 112 and consistent with the personal preferences 118 of the customer. It should be appreciated that the category 116 and preferences 118 are illustrative and non-limiting, and that the system 120 may allow other multi-modal input to guide the recommendation of complementary items conditioned on such input.

The complementary item recommendation system 120 comprises two stages configured to recommend complementary items based on the input 110. In the first stage, a visual similarity learning module 122 learns visual features of the scene image 112 to perform both similarity retrieval and compatibility retrieval. The visual similarity learning module 122 thus retrieves embeddings for the input image 110 that are input to the second stage. In the second stage, a complementary set learning module 124 performs compatibility contrastive learning via a flexible bidirectional transformer. As described further herein, the transformer leverages the similarity embeddings from the visual similarity learning module 122 to reason about the interactions between these embeddings and to model complementarity. The complementary set learning module 124 includes a category branch configured to provide supervision on categories, which enables the complementary set learning module to reason about complementary item types (i.e., categories). The complementary set learning module 124 further uses autoregression to improve the prediction of complementary objects given the objects 112 in the scene image 110. The complementary item recommendation system 120 thus performs similarity learning and complementarity learning. To some degree these two aspects contradict each other, because items that complement each other may not necessarily look similar. The subjectivity for both the similarity and complementarity is another major challenge for solving this task. The subjectivity makes the target ambiguous when designing a data driven method, and also creates an extra challenge for collecting such datasets that contains sets of complementary items. However, the architecture of the complementary item recommendation system 120 as described further herein enables the machine learning models of the system 120 to learn the subjectivity of complementarity in a self-supervised approach.

Given a scene or lifestyle image $\mathcal{I}$, a set of unordered objects $\mathcal{O}$ in the scene of the image, and a set of unordered object categories $\mathcal{C}$, the problem is to retrieve cross domain a set of complementary objects $\mathcal{X}$ belonging to those categories while compatible with the scene $\mathcal{I}$, where:

$$O = \{o_i^j\}_{i=0}^N, o_i \in \mathcal{D}_A$$
$$C = \{c_i^j\}_{i=0}^L, \text{ and}$$
$$X = \{x_i^j\}_{x=0}^L, x_i \in \mathcal{D}_B.$$

Here, the visual domains $\mathcal{D}_A$ and $\mathcal{D}_B$ are two different visual domains, L is the number of objects to retrieve during inference, and N is the number of objects in the scene. The difference between the two domains $\mathcal{D}_A$ and $\mathcal{D}_B$ can be quantified as the $\mathcal{F}$ distance F larger than a certain threshold $\theta$. The set compatibility is modeled as for any item $x_j \in \mathcal{X}$, in any order, the generated set $\mathcal{X}_i$ is self-compatible and compatible with the given scene $\mathcal{I}$. Further, the generated set $\mathcal{X}_i$ is:

$$\mathcal{X}_i = \{x_0, x_1, \dots, x_i\}, i \leq M,$$

and a function $C(\cdot)$ gets categories $\mathcal{C}_i$ of the object set $\mathcal{X}_i$ such that:

$$C(\mathcal{X}_i) = C_i = \{c_0, c_1, \dots, c_i\}, i \leq M,$$

where M is the maximum number of categories to compose a set.

The problem of generating a set of objects $\mathcal{X}$ conditioned on the scene image $\mathcal{I}$ and a specified set of categories is solved by computing the likelihood of generating item set $\mathcal{X}_i$. The probability $p(\mathcal{X}_i | \mathcal{I}, \mathcal{O}, \mathcal{C})$ of generating the item set $\mathcal{X}_i$ for a given lifestyle image $\mathcal{I}$, a given set of unordered objects $\mathcal{O}$ in the image, and a given set of unordered object categories $\mathcal{X}$ may be expressed as:

$$p(X_i | \mathcal{I}, O, C) = \sum_{\hat{X} \in \Phi(X_i)} p(x_i | x_0, \dots, x_{i-1}, \mathcal{I}, O, C), i \leq L,$$

where $\Phi(\mathcal{X})$ is all permutations of the object set $\mathcal{X}$ given all the permutations of the categories $\mathcal{C}$, and L is the maximum number of items to compose a set. For each permutation of $\mathcal{X}$, the set generation becomes a sequence generation problem. The sequence generation is modeled as an auto-regressive process. In the auto-regressive process, the next item in the set is generated conditioned on the prior items. This auto-regressive process statistically formulated as the multiplication of the probabilities:

$$p(x_i | x_0, \dots, x_{i-1}) = \prod_j^{j<(i-1)} p(x_j | x_0, \dots, x_{j-1}).$$

The probability $p(x_i | x_j, \mathcal{I}, \mathcal{O}, \mathcal{C})$ for item $x_i$ given item $x_j$, given image $\mathcal{I}$, object set $\mathcal{O}$, and category set $\mathcal{C}$ is:

$$p(x_i | x_j, \mathcal{I}, \mathcal{O}, \mathcal{C}) = p(c_i | x_j, \mathcal{I}, \mathcal{O}, \mathcal{C}) p(\hat{x}_i | x_j, \mathcal{I}, \mathcal{O}, \mathcal{C}).$$

The items $\mathcal{X}$ in the target set and the objects $\mathcal{C}$ in the source scene are from two image domains, where here the domain is the distance $\mathcal{D}$ of the distribution of the pixels of objects $\mathcal{X}$ and $\mathcal{C}$ are larger than a threshold $\theta$:

$$\mathcal{D}(\mathcal{X}, \mathcal{O}) \geq \theta.$$

To learn to conditionally generate the best set of objects, the model learns to maximize the log likelihood of the probability $p(\mathcal{X}_i | \mathcal{I}, \mathcal{O}, \mathcal{C})$. The log likelihood of generating the item set $\mathcal{X}_i$ for the given lifestyle image $\mathcal{I}$, the given set of unordered objects $\mathcal{O}$ in the image, and the given set of unordered object categories $\mathcal{C}$ is:

$$\log p(X_i | \mathcal{I}, O, C) = \sum_{\hat{X} \in \Phi(X_i)} \left( \sum_j^{j<i} \log p(x_i | x_j, \mathcal{I}, O, C) \right).$$

The two-stage learning framework provided herein approximates the log likelihood above in pixel space.

Figure 2:
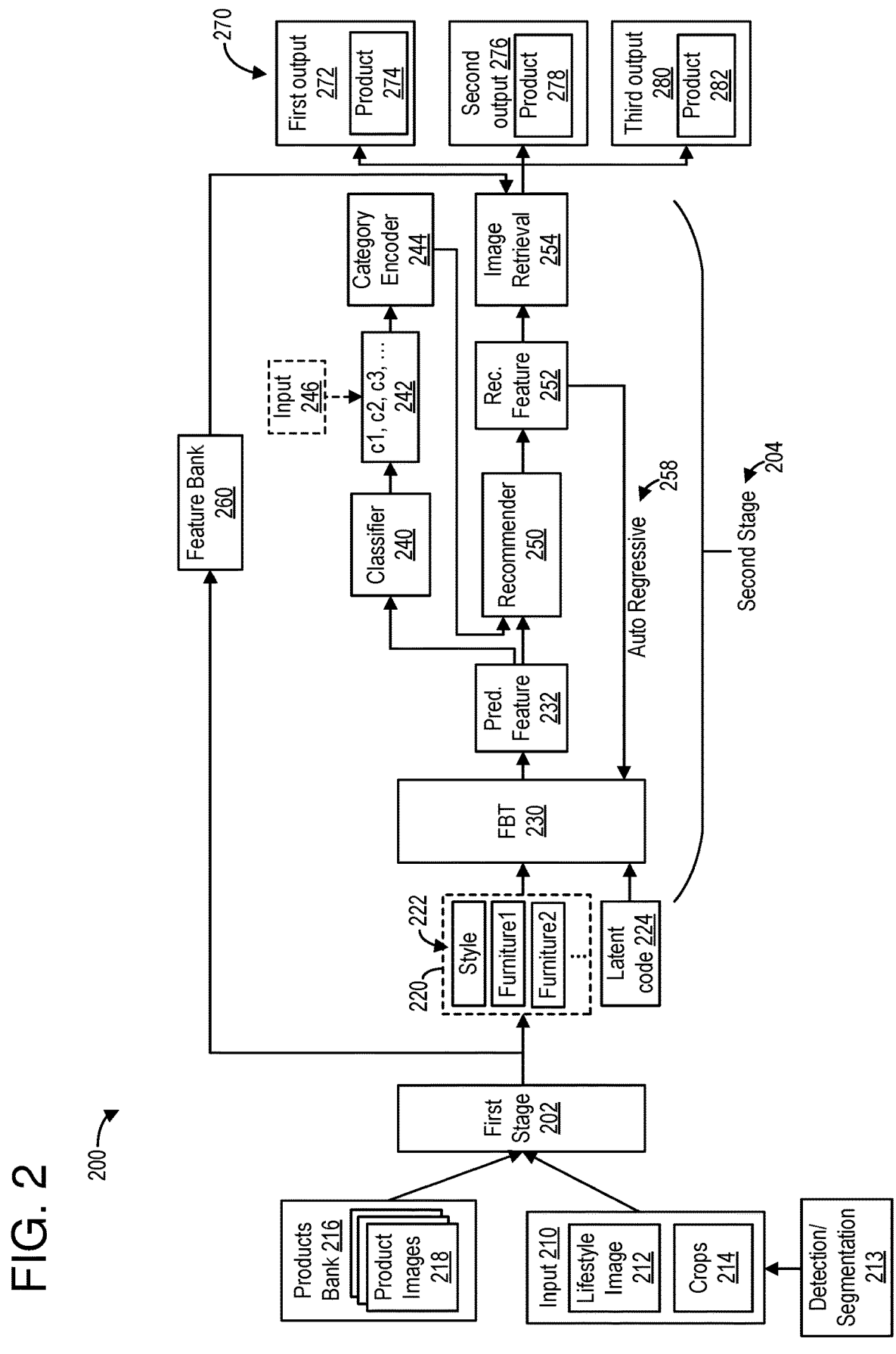
FIG. 2 shows a diagram illustrating an example architecture for an image-based complementary item recommendation system.

FIG. 2 shows a diagram illustrating an example architecture for an image-based complementary item recommendation system 200. The complementary item recommendation system 200 may comprise the image-based complementary item recommendation system 120 described hereinabove. As depicted, the complementary item recommendation system 200 comprises a first stage 202 and a second stage 204 configured to approximate the log likelihood discussed above in pixel space. The first stage 202 comprises a learning model configured to learn visual features to achieve both similarity retrieval and compatibility retrieval. The first stage 202 thus comprises the visual similarity learning module 122 of the image-based complementary item recommendation system 120. The second stage 204 uses the visual features output by the first stage 202 to model complementarity, as described further below. The second stage 204 thus comprises the complementary set learning module 124 of the image-based complementary item recommendation system 120.

As depicted, the input 210 to the first stage 202 comprises a lifestyle image 212 depicting one or more objects arranged relative to each other in a scene. The input 210 may further comprise one or more cropped images 214, or crops, of the objects depicted in the lifestyle image 212. For example, the lifestyle image 212 may comprise a photograph of a living room or other space, wherein various objects such as a couch, a lamp, a shelf, a rug, wall art, and so on are positioned relative to each other. The lifestyle image 212 may be cropped to generate the cropped images 214, wherein each cropped image 214 comprises a portion of the lifestyle image 212 containing a respective object depicted in the lifestyle image 212. For the example lifestyle image 212 described above, the cropped images 214 may therefore comprise a cropped image of the couch, a cropped image of the lamp, a cropped image of the shelf, a cropped image of the rug, a cropped image of the wall art, and so on. It should be appreciated that the lifestyle image 212 may comprise images of other objects, such as clothing, artwork, vehicles, devices, and so on, without limitation. Further, the lifestyle image 212 may not depict any objects, but instead may generally depict a style, for example through abstract representations of colors, textures, and the like. Even when the image 212 depicts objects, the image 212 is understood to depict a style. Further, a detection/segmentation module 213 may process the lifestyle image 212 to generate the crops 214, for example by detecting objects within the lifestyle image 212 and segmenting the detected objects to provide the crops 214.

A products bank 216 comprising a plurality of product images 218 may also be input to the first stage 202 and thus input to the complementary item recommendation system 200. Each product image 218 in the products bank 216 may depict a product (e.g., an object or item) that may be recommended by the complementary item recommendation system 200.

The learning framework of the complementary item recommendation system 200 comprises two stages. The first stage 202 comprises a similarity feature extractor that projects object pixel information to an embedding that clusters objects that are similar and can represent features for compatibility at the same time. The second stage 204 comprises a flexible bidirectional transformer (FBT) 230 that models complementarity.

In the first stage 202, the feature embedding learned via visual similarity targets reduces the complexity of learning the best feature embedding in the second stage 204 for scene-based complementary image retrieval tasks. Learning visual similarity in the first stage 202 enables the system 200 to learn cross-domain visual compatibility. In some examples, the first stage 202 comprises a convolutional neural network (CNN)-based visual similarity model. The CNN-based visual similarity model of the first stage 202 projects the scene image $\mathcal{I}$ (i.e., the lifestyle image 212), the objects in the image $\mathcal{O}$ (i.e., the crops 214), and the item images in the retrieval pool $\mathcal{X}$ (i.e., the product images 218) into an embedding using this feature extractor:

$$\{I,O,X\}=g(\{\mathcal{I},\mathcal{O},\mathcal{X}\}), \mathcal{I}\in\mathbb{R}^3, \mathcal{O}\in\mathbb{R}^3, \mathcal{X}\in\mathbb{R}^3,$$

where g is the visual similarity model. The first stage 202 may thus map the input 210 and the product images 218 of the products bank 216 to feature embeddings 220, wherein the feature embeddings 220 comprise a plurality of vectors 222 that may respectively correspond to the different input (e.g., the style depicted in the style image, the individual furniture items depicted therein, and so on). The first stage 202 may be trained using a normalized softmax loss and soft-margin triplet loss. By obtaining the projections (e.g., feature embeddings 220), the second stage 204 does not start from raw pixel space, and is thus able to both converge faster and learn the best representation for visual compatibility.

The second stage 204 performs visual compatibility learning. The feature embeddings 220 generated by the first stage 202 are input to the second stage 204. Specifically, the feature embeddings 220 are input to the flexible bidirectional transformer 230. Further, latent code 224 is also input to the transformer 230 via an input layer, for example. The latent code 224 may comprise a random n-dimensional vector generated from a Gaussian distribution, as an illustrative and non-limiting example.

In the second stage 204, given the feature embeddings 220, the flexible bidirectional transformer 230 approximates the likelihood of predicting the next item $x_i$ given the scene image $\mathcal{I}$, objects $\mathcal{O}$ in the scene with or without specific categories $\mathcal{C}$. The flexible bidirectional transformer 230 comprises a transformer encoder with a trainable token, random shuffling, random length sequence masking, and category supervision. During inference, the transformer 230 generates an unordered set auto-regressively. A trainable variable denoted as q is used to extract inter-token relations. The output of the transformer encoder is:

$$q'=e(EI,\phi(EO);Eq)=\text{MLP}(\text{MSA}(EI,\phi(EO),Ee,Eq)$$

where MLP is a multilayer perceptron, MSA is multi-headed self-attention layers, and:

$$EO=[Eo_1,Eo_2,\ldots,Eo_M,\text{mask}].$$

In the above, q' is the corresponding output of the trainable input token q, e is the end token, e( ) is the transformer encoder with MSAs and MLPs, E is a linear projection, I is the embedded scene image embedding, $o_i$ is the embedded object in the scene, and M is the unmasked sequence length. The output q' of the transformer 230 is thus a predicted feature 232 and can be used for predicting both the category $C_{M+1}$ and the visual embedding of the next item $x_{M+1}$ as described further below.

The second stage 204 further comprises a classifier 240 configured to provide category supervision, and thus to help the model to reason about the complementary item types. The classifier 240 may comprise a machine learning model such as a multilayer perceptron, as an illustrative example. Given the predicted feature(s) 232, the classifier 240 may thus classify the predicted feature(s) 232 to determine categories 242 (e.g., c1, c2, c3, and so on). In some examples, a desired category may be input 246 such that a user (e.g., a customer) may select one or more categories of complementary items to be recommended. For example, while the user may input a lifestyle image 212 depicting a couch, the user may specifically want recommendations of products within a specific category that are complementary to the depicted couch, such as a coffee table, as opposed to other categories that may be included in the categories 242, such as lamps, rugs, and so on. The category encoder 244 encodes the categories 242. An output category embedding $\hat{c}$ may thus be obtained:

$$\hat{c}=\text{MLP}(q').$$

The output category embedding $\hat{c}$ is supervised with cross-entropy loss.

The second stage 204 further comprises a recommender 250 configured to generate a recommended feature 252 comprising an indication of a recommended complementary item. The recommender 250 may comprise a machine learning model such as a multiplayer perceptron, as an illustrative and non-limiting example. The category embedding output by the category encoder 244 and the predicted feature 232 output by the transformer 230 are input to the recommender 250, such that:

$$\hat{x}_{M+1}=\text{MLP}[q',\hat{c}],$$

where $\hat{x}_{M+1}$ is the next predicted item given the output q' of the transformer 230 and the category embedding $\hat{c}$. This output (i.e., the recommended feature 252) is fed back to the transformer 230 through autoregression 258. The autoregression 258 allows the second stage 204 to more effectively learn and thus predict products. The visual feature embedding $\hat{x}$ for the compatible image retrieval is supervised using a triplet loss. To form a triplet, the anchor is the predicted embedding $\hat{x}_{M+1}$, the positive of the triplet is the target item's feature embedding $\hat{x}_{M+1}$ generated by the visual similarity model of the first stage 202. For the negative(s), same-category object(s) are randomly selected from the target domain and their feature embeddings are generated using the first stage 202.

In order to output recommended products, for a given recommended feature 252, image retrieval 254 retrieves one or more images for the given recommended feature 252. Image retrieval 254 may further use input from feature bank 260 storing features (e.g., feature embeddings 220) generated by the first stage 202. The output 270 of the second stage 204 may thus comprise one or more recommended products. As depicted, a first output 272 may comprise an image of a first recommended product 274 and/or a unique identifier for the first recommended product 274, a second output 276 may comprise an image of a second recommended product 278 and/or a unique identifier for the second recommended product 278, a third output 280 may comprise an image of a third recommended product 282 and/or a unique identifier for the third recommended product 282, and so on.

Regarding training, triplet loss is applied to the recommender 250 to learn feature embeddings $\hat{x}$ for the compatible image retrieval. The triplet is formed with an anchor, a positive, and one or more negatives. In this example, the anchor is the predicted embedding of a token, and the positive is the feature embedding 220 generated by the first stage 202 (e.g., for its corresponding plain-background product image 218). The one or more negatives comprise feature embeddings generated by the first stage 202 for one or more negative product images 218 randomly selected from the same category of the anchor.

One challenge in the feature learning domain is the space collapsing where points in the embedding space are too close, resulting in an ineffective use of the representational capacity of the learned space. To avoid such an issue, a differential entropy regularizer maximizes the distance between each point and its closest neighbor in the embedding space. The regularizer is defined as:

$$\text{Reg} = -\frac{1}{N}\sum_{i}^{N}\log(D_{min_{i\neq j}}(z_i, z_j)),$$

where the L2 distance between samples i and j is divided by four as $D_{i,j}$ to make the distance between 0 and 1.

As the system 200 is configured to retrieve items based on an input scene image (e.g., lifestyle image 212), the image-based complementary item recommendation system 200 allows users to quickly search for and purchase a product (or one that is similar and/or complementary) by taking a picture of the product when they see it anywhere. The system 200 overcomes the issue where products in online shopping photographs are typically depicted in a canonical position on a plain background with appropriate lighting, in contrast to the real-world scenes captured in lifestyle images 212 where products may be found in a variety of poses, backgrounds, and settings. To effectively train the system 200, datasets may be constructed such that every scene matches with a set of cropped furniture and the corresponding plain background product images. Since most of the scene images for training may be created by designers, the cropped furniture within a scene may be assumed to be stylistically compatible with each other. The product bank is organized by category and may be used for both positive and negative sampling as discussed further herein. Further, all images go through the same backbone (i.e., the first stage 202) to extract feature embeddings. In this way, the system 200 may be trained in a self-supervised manner to perform complementary item recommendation and retrieval applications.

Further, the system 200 enables cross-domain retrieval. For example, if the input image depicts an object of a given category (say a specific t-shirt in a t-shirt category or a barstool in a barstool category, for example), the system 200 may recommend items within the given category. However, the system 200 may also recommend items in other categories, including categories that are not depicted in the input image. In this way, given a photograph of a couch and a lamp as input, the system 200 can recommend objects in other categories not depicted in the photograph, such as a side table, rug, home décor, and so on, that are complementary to the overall style depicted in the photograph and the objects themselves.

Figure 3:
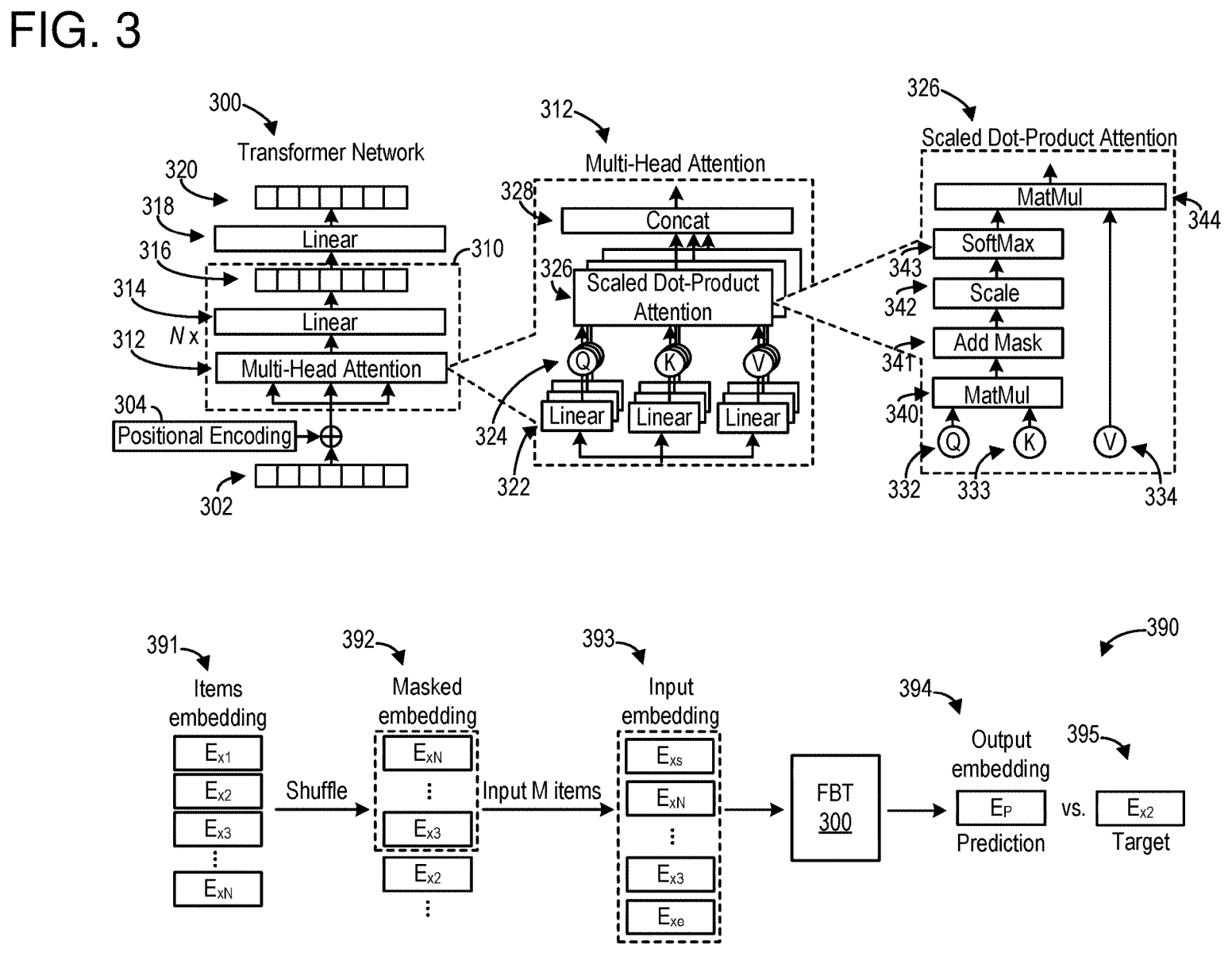

FIG. 3 shows an example structure of a transformer 300 with N attention layers 310. The transformer 300 may be implemented as the transformer 230, for example. Transformer 300 comprises multiple (i.e., N) attention layers 310 with each layer 310 comprising a multi-head attention layer (Attn) 312 followed by a feed forward layer (FF) 314. The multi-head attention layer 310 embeds input sequence X, depicted as input vector 302, into an internal representation referred to as a context vector C, depicted as context vector 316. Positional encoding 304 may be applied to the input vector 302 prior to feeding the input vector 302 to the attention layers 310. The context vectors 316 from the N attention layers 310 are fed to linear layer 318 to obtain the output vector 320.

The output of the multi-head attention layer 312, the context vector C, is computed using a query vector Q, and a key K value V pair from input with or without a mask M via:

9

$$C = FF(\mathrm{Attn}(Q, K, V, M))$$

$$= FF\left(\mathrm{softmax}\left(\frac{QK^T + M}{\sqrt{D}}\right)V\right),$$

where the tensors are:

$$Q = XW^Q,$$

$$K = XW^K,$$

$$V = XW^\hat{x}V,$$

where D is the number of channels in the attention layer and W are trainable weights. Thus, as depicted, the input vector 302 when input to a multi-head attention layer 312 is fed to a plurality of linear layers 322 to obtain a respective plurality of tensors 324 (i.e., the tensors Q, K, and V). The plurality of tensors 324 are then input to a respective plurality of scaled dot-product attention layers 326. For each scaled dot-product attention layer 326, the query tensor Q (tensor 332) and the key tensor K (tensor 333) are matrix multiplied 340 ($QK^T$), a mask is added 341 ($QK^T + M$), the result is scaled 342 by the square root of the dimension D of the tensors (($QK^T + M)/\sqrt{D}$), and the softmax is calculated 343. The result is then matrix multiplied 344 with the value tensor V to thus calculate the scaled dot-product attention 326. The scaled dot-product attentions 326 are concatenated 328 to generate the output of the multi-head attention 312, and thus to obtain the context tensor 316.

As an illustrative and non-limiting example, the transformer 300 may comprise a six-layer transformer encoder with eight heads, where the input and output dimensions are two hundred fifty-six. For training, the number of output query may be set to one, whereas for testing, the number of output queries may be set to nine. For the training phase, the training may randomly sample, from zero to the total product number in a scene, products as the input set, with one product not in the input set as the output. The scene embedding may be placed at the beginning of the input set; the scene embedding may be taken as the start token, while a zero vector may be taken as the end token. The output will be the end token when the input set contains all the products in the scene. During the testing phase, the autoregression is used to predict products and stops when the prediction output number reaches nine or the prediction output is the end token.

As an illustrative example, FIG. 3 also illustrates an example training phase 390 for the transformer 300. Items embedding 391 includes N items. The items embedding 391 is shuffled and masked to obtain a masked embedding 392 containing a random sampling of M∈ [0, N] items, where the (M+1)th item (in this example, $E_{x2}$) is set as the output target 395. The M items are used to create input embedding 393 which includes the scene embedding $E_{xs}$ as the initial token as well as an end token $E_{xe}$ comprising a zero vector to denote the end of the sequence. The output will thus be the end token when the input set contains all the items in the scene. The input embedding 393 is input to the transformer 300 to obtain the output embedding 394 comprising a prediction Ep that can be compared to the output target 395 for training. Through this random shuffling and random length sequence masking approach to training, the transformer 300 effectively learns visual complementarity given visual features as input.

Figure 4:
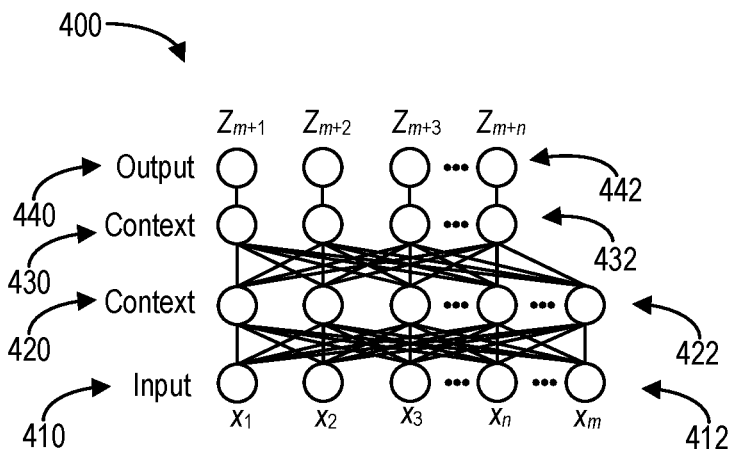
FIG. 4 shows a diagram illustrating an example full-attention mechanism for the transformer model.

FIG. 4 shows an example attention and supervision mechanism 400. The structure is depicted with a simplified two-layer model, though it should be appreciated that more complex models may be used. The mechanism 400 employs full attention and predicts n futures from the last input m. The input tensors 412 of the input layer 410 are computed into context tensors 422 and 432 through full attention transformer layers 420 and 430, respectively, to obtain the output tensors 442 (e.g., predictions) of the output layer 440.

In order to reliably predict and recommend complementary objects based on scene images, the complementary item recommendation system provided herein is trained using a self-supervised approach, and furthermore is trained in two stages. Specifically, as discussed hereinabove, the first stage is trained to perform both similarity and compatibility retrieval, while the second stage is trained for compatibility contrastive learning. As an illustrative and non-limiting example, the first stage may comprise a visual similarity model, such as a convolutional neural network with, for example, fifty layers followed by a combination of average pooling and generalized mean pooling global descriptors. The two pooling global descriptors may be averaged as a final 2048-dimensional image embedding. This visual similarity model may be trained with normalized softmax loss and soft-margin triplet loss for a retrieval task.

For visual scene-based complementary item recommendation applications, there is no way to know what scene image a user may input to the system. In order to better accommodate unexpected scenes, the flexible bidirectional transformer is trained with a deep bidirectional representation. For training, a random length of product embeddings is first sampled and then embeddings not in the input set are predicted. Both the input length and the product embeddings are random during the training. This training approach allows the transformer to be both flexible and bidirectional.

Figure 5:
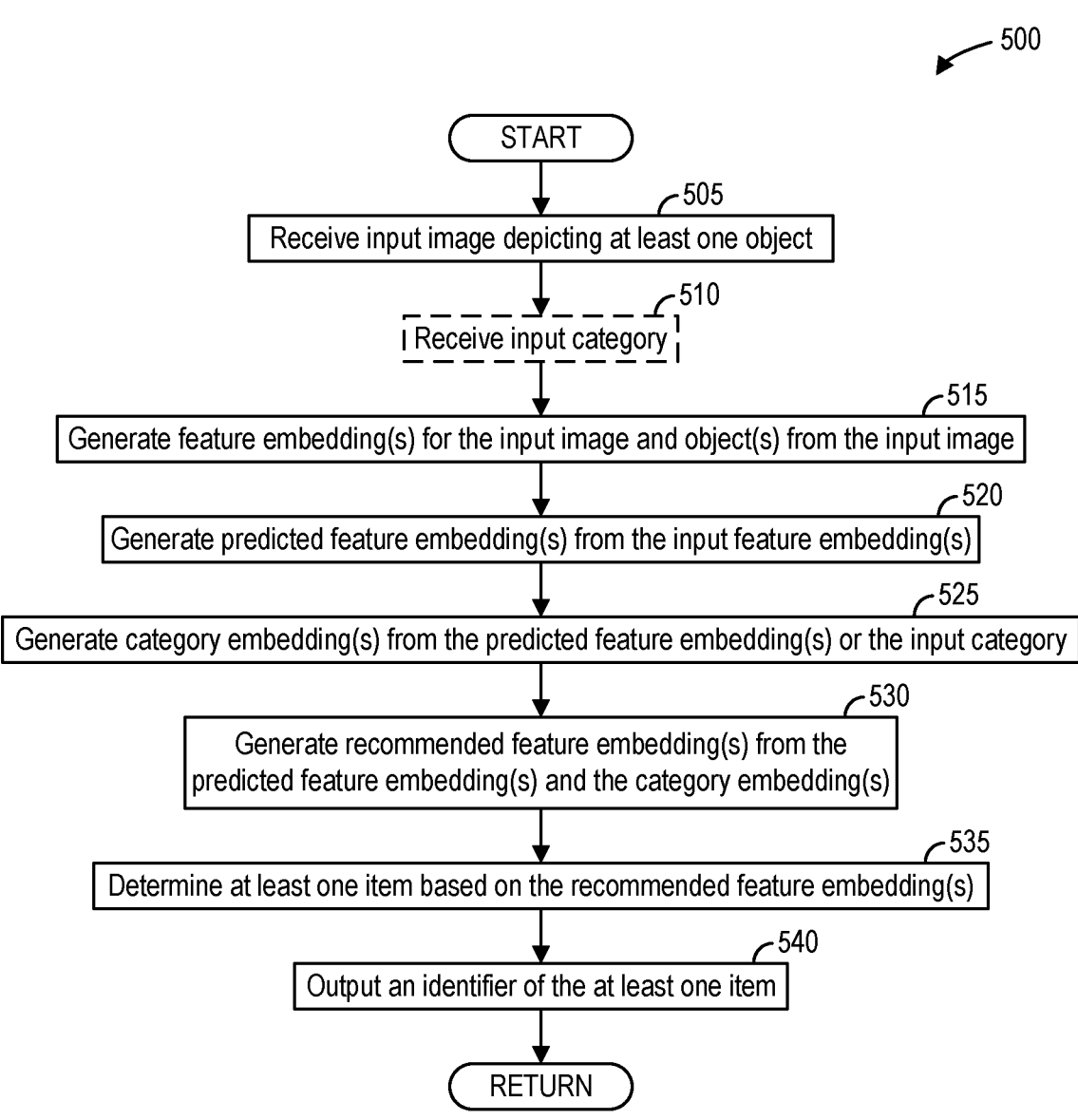
FIG. 5 shows a high-level flow chart illustrating an example method for image-based complementary item recommendations.

FIG. 5 shows a high-level flow chart illustrating an example method 500 for image-based complementary item recommendations. Method 500 is described with regard to the systems and components of FIGS. 1-4, though it should be appreciated that the method 500 may be implemented with other systems and components without departing from the scope of the present disclosure.

Method 500 begins at 505. At 505, method 500 receives an input image depicting at least one object. The input image may comprise a photograph of the at least one object in a scene, for example, as opposed to a photograph of the at least one object with a white background. A user may input the input image in order to obtain recommendations of complementary products. Additionally or alternatively, the user may input the input image in order to retrieve the at least one object itself, for example from a product catalog.

At 510, method 500 optionally receives an input category. For example, in addition to the input image, the user may input a category to indicate a product category for generating recommendations. In this way, whereas the complementary item recommendation system may be capable of outputting recommendations for complementary objects in a plurality of categories, a user can narrow the output to a desired category.

At 515, method 500 generates one or more feature embedding(s) for the input image as well as object(s) depicted in the input image. Method 500 may generate the one or more feature embedding(s) for the input image and the object(s) depicted in the input image, for example, by inputting the input image to the visual similarity learning module 122, which may comprise a machine learning model such as the convolutional neural network of the first stage 202. Further, method 500 may optionally crop the input image to generate cropped image(s) of the object(s) depicted in the input image, and method 500 may further generate feature embedding(s) for the cropped image(s).

At 520, method 500 generates one or more predicted feature embedding(s) from the input feature embedding(s). For example, method 500 may generate the one or more predicted feature embedding(s) by inputting the input feature embedding(s) generated at 515 into the complementary set learning model 124, which may comprise a machine learning model such as the flexible bidirectional transformer 230 of the second stage 204.

At 525, method 500 generates one or more category embedding(s) from the predicted feature embedding(s) or the input category. For example, method 500 may input the predicted feature embedding(s) to a category classifier, such as the classifier 240, of the second stage 204 to obtain one or more category embeddings for the predicted feature embedding(s). Alternatively, if an optical input category was received at 510, method 500 may generate the one or more category embedding(s) based on the optional input category received at 510.

At 530, method 500 generates one or more recommended feature embedding(s) from the predicted feature embedding(s) and the category embedding(s). For example, method 500 may generate the one or more recommended feature embedding(s) by inputting the predicted feature embedding(s) and the category embedding(s) to a machine learning model such as the recommender 250, which may comprise a multilayer perceptron. The one or more recommended feature embedding(s) may correspond to one or more products that complement the object(s) depicted in the input image.

At 535, method 500 determines at least one item based on the recommended feature embedding(s). For example, method 500 may retrieve one or more of an image and/or a unique identifier for an item corresponding to the recommended feature embedding(s). The at least one item may comprise a product that is complementary to the object(s) depicted in the input image. In some examples, one of the at least one items determined may include an object depicted in the input image. At 540, method 500 outputs at least an identifier of the at least one item. For example, method 500 may output the identifier of the at least one item so that information relating to the at least one item, including but not limited to the product image of the at least one item, may be displayed to the user. Method 500 then returns.

Figure 6:
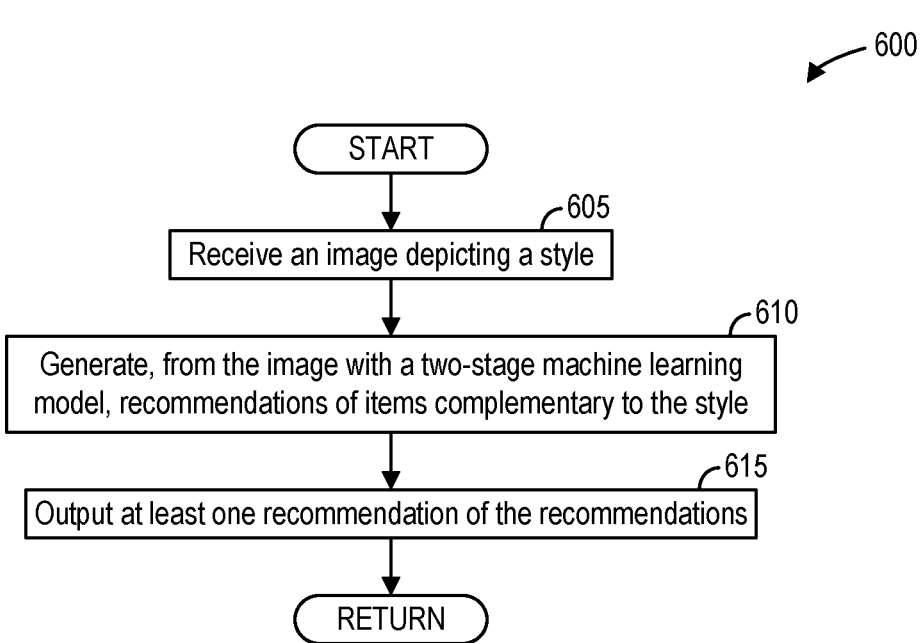
FIG. 6 shows a high-level flow chart illustrating an example method for generating recommendations of complementary items.

FIG. 6 shows a high-level flow chart illustrating an example method 600 of generating recommendations of complementary items. Method 600 is described with regard to the systems and components of FIGS. 1-4, though it should be appreciated that the method 600 may be implemented with other systems and components without departing from the scope of the present disclosure.

Method 600 begins at 605. At 605, method 600 receives an image depicting a style. The style may comprise a visual style, for example, which may be depicted in the image through colors, structures, objects, arrangements of such objects relative to structures, and so on. At 610, method 600 generates, from the image depicting the style with a two-stage machine learning model, recommendations of items complementary to the style. For example, to generate recommendations with a two-stage machine learning model such as the image-based complementary item recommendation system 120 or the image-based complementary item recommendation system 200, method 600 generates feature embeddings for the image depicting the style, for example with the first stage, and then inputs the feature embeddings into a transformer network, such as the flexible bidirectional transformer. Method 600 then outputs recommendations of complementary items from the transformer network. At 615, method 600 outputs at least one recommendation of the recommendations. Method 600 then returns.

Figure 7:
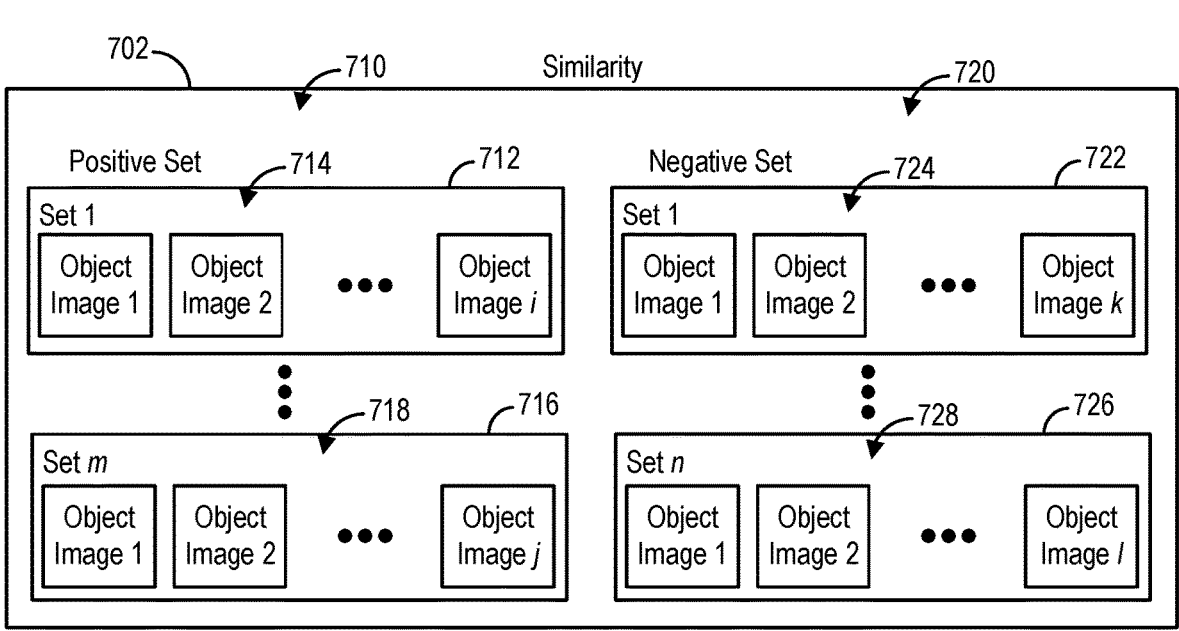
FIG. 7 shows a diagram illustrating example training datasets for self-supervised training of an image-based complementary item recommendation system.
Figure 7:
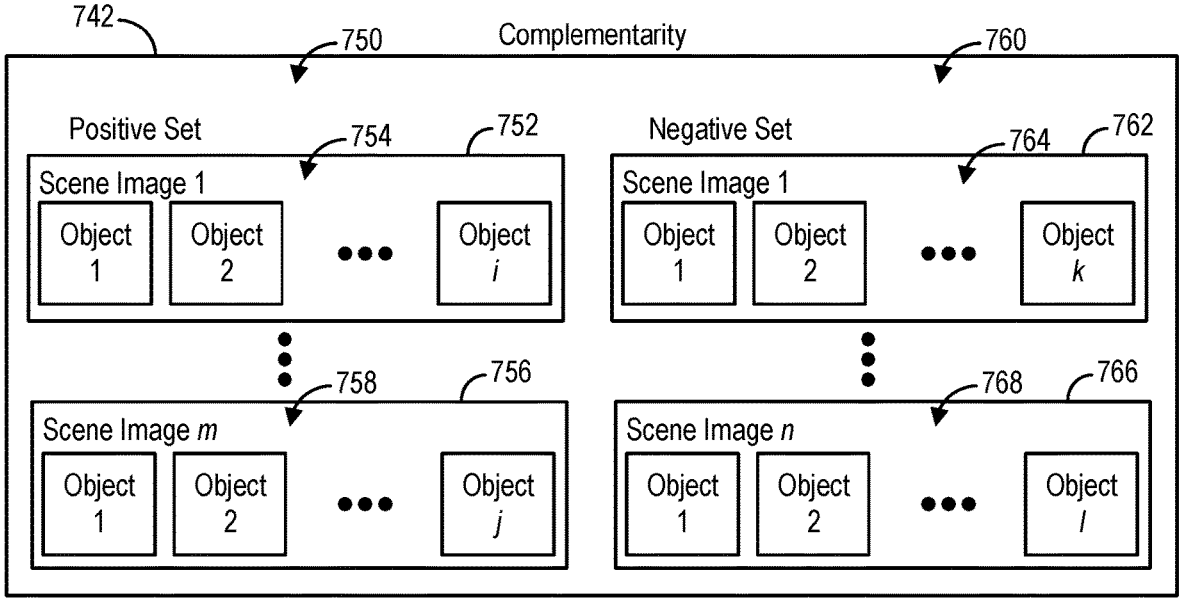

As mentioned hereinabove, the two-stage learning framework provided herein may be trained using a self-supervised approach. To that end, a variety of training datasets may be used to effectively train the complementary item recommendation system provided herein. FIG. 7 shows a diagram illustrating example training data 700. The training data 700 may include similarity training data 702 comprising a plurality of positive sets 710 and a plurality of negative sets 720. For example, the similarity training data 702 may include m positive sets, ranging from a first positive set 712 comprising a plurality of object images 714 to an mth positive set 716 comprising a plurality of object images 718. The plurality of object images 714 may comprise i object images that are considered similar, hence the plurality of object images 714 comprising a positive set 712, while the plurality of object images 718 may comprise j other object images that are considered similar, hence the plurality of object images 718 comprising a positive set 716. Similarly, the object training data 702 also may include n negative sets, ranging from a first negative set 722 comprising a plurality of object images 724 to an nth negative set 726 comprising a plurality of object images 728. The plurality of object images 724 may comprise k object images that are considered not similar, hence the plurality of object images 724 comprising a negative set 722, while the plurality of object images 728 may comprise/other object images that are also considered not similar, hence the plurality of object images 728 comprising a negative set 726.

The training data 700 may also include complementary training data 742 comprising a plurality of positive sets 750 and a plurality of negative sets 760. For example, the complementary training data 742 may include m positive sets, ranging from a first positive scene image 752 comprising an image of a scene including a plurality of objects 754 to an mth positive scene image 756 comprising an image of a scene including a plurality of objects 758. The plurality of objects 754 may comprise i objects that are considered complementary, hence the plurality of objects 754 comprising a positive scene image 752, while the plurality of objects 758 may comprise j other objects that are considered complementary, hence the plurality of objects 758 comprising a positive scene image 756. Similarly, the complementary training data 742 also may include n negative sets, ranging from a first negative scene image 762 comprising a plurality of objects 764 to an nth negative scene image 766 comprising a plurality of objects 768. The plurality of objects 764 may comprise k objects that are considered not complementary, hence the plurality of objects 764 comprising a negative scene image 762, while the plurality of objects 768 may comprise l other objects that are also considered not complementary or compatible, hence the plurality of objects 768 comprising a negative scene image 766.

As an illustrative and non-limiting example, a dataset may cover a total of eighty-one fine-grained furniture and home product categories, contain over two-hundred-thousand room-scene images, over six-hundred-thousand cropped furniture images, and over seven-hundred-thousand white background product images. Class labels and locations of furniture and décor products may be annotated on the scene images with each product also linked to a plain-background product image, where each scene image contains five to six different furniture objects on average. Another example dataset may include tens of thousands of interior home design images with tens of thousands of home decor items, with a correspondingly large number of scene-product pairs, and bounding boxes for products to create positive and negative sets.

Figure 8:
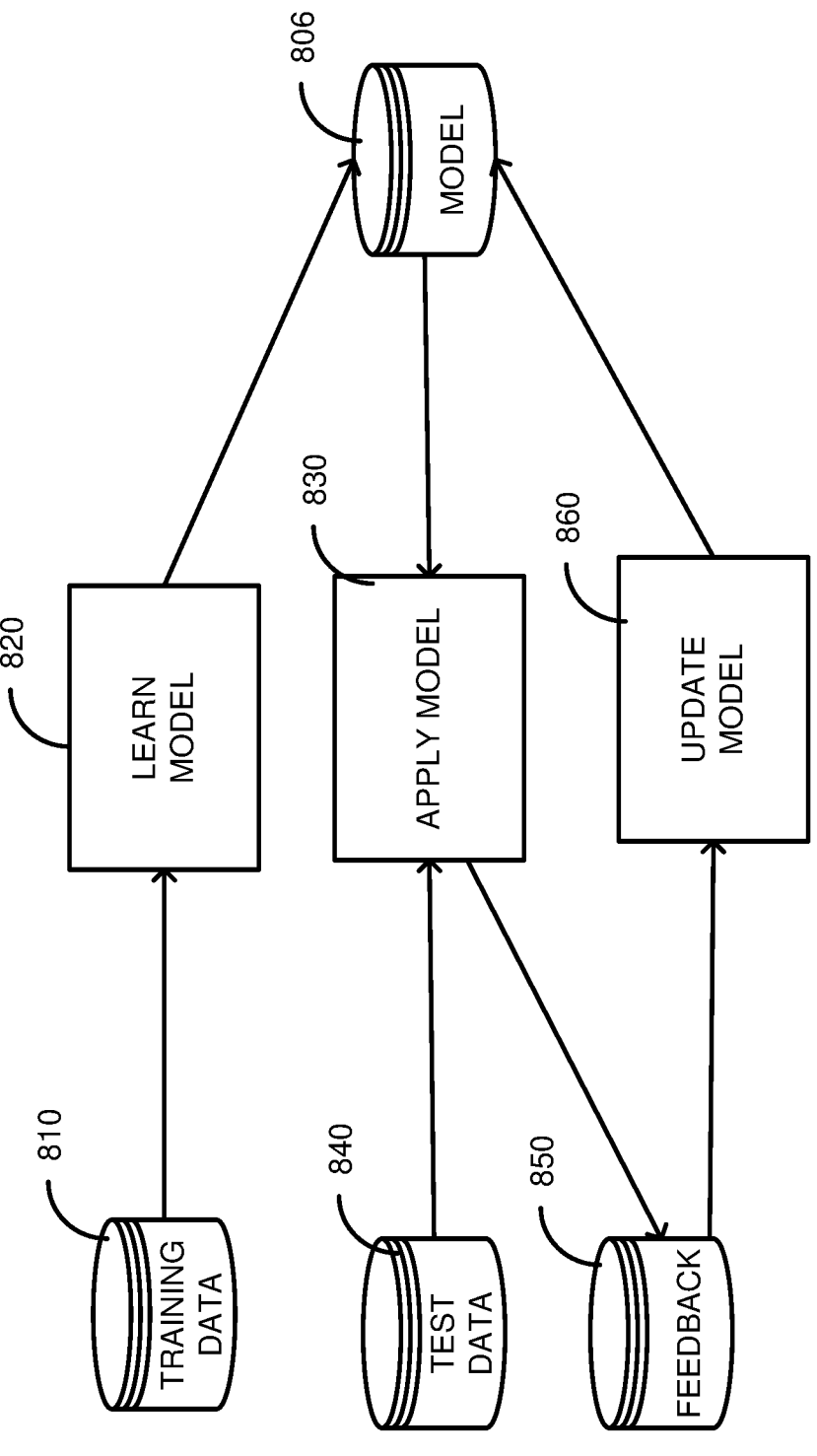
FIG. 8 shows a diagram illustrating an overall system for learning and applying machine learning models.

FIG. 8 shows an example system for generating a machine learning model 806. A database 810 including training data can be used to learn the model (module 820). Once a first iteration of the model is generated, the model can be applied (module 830) to test data 840. Feedback 850 can be used to update the model 860.

Figure 9:
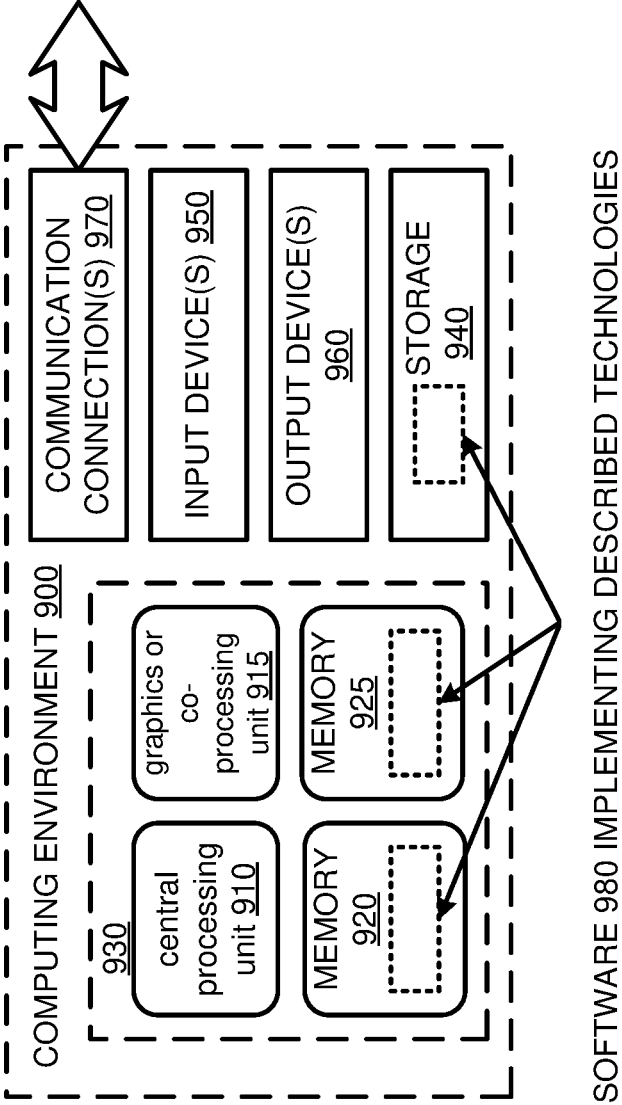
FIG. 9 shows a diagram illustrating an example computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, a camera device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of generating recommendations of complementary items, the method comprising:
   receiving an image depicting a style;
   generating, from the image with a two-stage machine learning model comprising a first stage for visual similarity learning and a second stage for complementary learning, recommendations of items complementary to the style; and
   outputting at least one recommendation of the recommendations;
   wherein generating the recommendations of the items complementary to the style comprises generating, from predicted features for the style with a multilayer perceptron of the second stage of the two-stage machine learning model, category embeddings for the items complementary to the style.

2. The method of claim 1, wherein the first stage of the two-stage machine learning model comprises a convolutional neural network, the method further comprising:
   generating, with the convolutional neural network, feature embeddings for the image depicting the style.

3. The method of claim 2, wherein the second stage of the two-stage machine learning model comprises a transformer network, the method further comprising:
   generating, from the feature embeddings with the transformer network, the predicted features for the style.

4. The method of claim 3, wherein the second stage of the two-stage machine learning model comprises a second multilayer perceptron, the method further comprising:
   generating, from the predicted features with the second multilayer perceptron, the at least one recommendation of the recommendations.

5. The method of claim 4, further comprising:
   inputting the category embeddings with the predicted features to the second multilayer perceptron to generate the at least one recommendation of the recommendations.

6. The method of claim 1, wherein receiving the image depicting the style comprises receiving a photograph of a real-world scene containing a plurality of objects.

7. The method of claim 6, wherein the items complementary to the style are complementary to the plurality of objects.

8. The method of claim 1, wherein outputting the at least one recommendation of the recommendations comprises outputting one or more of a product image and a unique identifier for a complementary item corresponding to the at least one recommendation.

9. One or more computer-readable media comprising computer-executable instructions that, when executed, cause a computing system to perform a method of generating recommendations of complementary items, the method comprising:
   receive an image depicting a style;
   generate, with a first stage of a two-stage machine learning model, feature embeddings for the image depicting the style;
   input the feature embeddings into a transformer network of a second stage of the two-stage machine learning model;
   input recommended feature embeddings from the transformer network to a multilayer perceptron to generate recommendations of complementary items;
   input the recommendations generated by the multilayer perceptron to the transformer network for autoregression of the transformer network, wherein the transformer network is trained with random shuffling and random length sequence masking for unordered set generation; and
   output the recommendations of the complementary items from the transformer network.

10. The one or more computer-readable media of claim 9, wherein the instructions, upon execution, further cause the computing system to:
   input the image depicting the style into a convolutional neural network to generate the feature embeddings for the image depicting the style.

11. The one or more computer-readable media of claim 9, wherein the image depicting the style comprises a photograph of an object, wherein the feature embeddings for the image depicting the style comprise feature embeddings for the style and the object, and wherein the complementary items are complementary to the style and the object.

12. The one or more computer-readable media of claim 9, wherein the transformer network is configured with a plurality of multi-head attention layers with full attention.

* * * * *